United States Patent [19]
Knox

[11] Patent Number: 5,265,109
[45] Date of Patent: Nov. 23, 1993

[54] ULTRASHORT OPTICAL PULSE SIGNALS GENERATION

[75] Inventor: Wayne H. Knox, Rumson, N.J.

[73] Assignee: AT&T Bell Laboratories, Murray Hill, N.J.

[21] Appl. No.: 965,473

[22] Filed: Oct. 23, 1992

[51] Int. Cl.$^5$ .............................................. H01S 3/098
[52] U.S. Cl. ....................................... 372/18; 372/23; 372/70; 372/97
[58] Field of Search ....................... 372/70, 97, 23, 25, 372/18

[56] References Cited

U.S. PATENT DOCUMENTS 4,815,080 3/1989 Chesney et al. ....................... 372/18

OTHER PUBLICATIONS

"60-fsec Pulse Generation From a Self-Mode-Locked Ti:Sapphire Laser" D. E. Spense, et al., Optics Letters, vol. 16, No. 1 Jan. 1, 1991 pp. 42–44.
"Femtosecond Pulses From a Continuously Self-Starting Passively Mode-Locked Ti:Sapphire Laser" U. Keller, et al., Optics Letter. vol. 16, No. 13, Jul. 1, 1991 pp. 1022–1024.
"Generation of 50-fsec pulses from a Pulse-Compressed, CW, Passively Mode-Locked Ti:Sapphire Laser", N. Sarukura et al. Optics Letters, vol. 16, No. 3, Feb. 1, 1991 pp. 153–155.
"Broadly tunable High Repetition Rate Femtosecond Optical Parametric Oscillator" D. Edelstein et al., Appl. Phys. Lett 54(18), May 1, 1989 pp. 1728–1730.
"Continuous-Wave Mode-Locked and Dispersion-Compensated Femtosecond Optical Parametric Oscillator", E. S. Wachman et al., Optics Letters, vol. 15, No. 2, Jan. 15, 1990, pp. 136–138.
"Tunable Femtosecond Dye Laser Synchronously Pumped by the Compressed Second Harmonic of Nd:YAG" A. M. Johnson and W. M. Simpson, J. Opt. Soc. Am. B, vol. 2, No. 4 Apr. 1985 pp. 619–625.
"Stabilization of a Femtosecond Dye Laser Synchronously Pumped by a Frequency-Doubled Mode-Locked YAG Laser", J. Chesnoy and L. Fini, Optics Letters, vol. 11, No. 10, Oct. 1986, pp. 635–637.
C-P. Huang, et al., Optics Letters, vol. 17, No. 2, Jan. 15, 1992 pp. 139–141.

Primary Examiner—Rodney B. Bovernick
Assistant Examiner—Robert McNutt
Attorney, Agent, or Firm—Eugene S. Indyk

[57] ABSTRACT

Apparatus is disclosed for generating two streams of optical pulse signals having less than 100 femtoseconds of jitter. A Ti:sapphire laser that is self mode locked by using self focusing in the gain medium and a weak HITCI intercavity dye jet for starting generates a first stream of substantially 100 femtosecond pulses. This first stream of optical pulses is split into two parts, one of which is used as a desired stream of optical pulses and the other of which is used to pump an HITCI dye laser synchronously to generate a second desired stream of optical pulses. The pulses of the second stream from the dye laser have durations of about 140 femtoseconds and less than 100 femtoseconds of jitter relative to the pulses of the first stream. Stated differently, if pulses of about 100 femtoseconds duration are used to pump a gain medium which exhibits strong gain saturation, then the pulses which are generated will have less than 100 femtoseconds of jitter relative to the pump pulses provided that the generated pulses have durations which are greater than the pump pulses. In the embodiment disclosed, the laser which is pumped with the first stream of pulses is a HITCI dye laser having a small positive dispersion in its cavity to ensure that the pulses generated by the dye laser pulses remain slightly larger than the pump pulses.

11 Claims, 6 Drawing Sheets

ULTRASHORT OPTICAL PULSE SIGNALS GENERATION

TECHNICAL FIELD

This invention relates generally to the generation of ultrashort optical pulse signals and, more particularly, to the generation of at least two streams of independently tunable ultrashort optical pulses having negligible jitter.

BACKGROUND OF THE INVENTION

Recently, streams of optical pulses having durations of about 100 femtoseconds and tunable in the near infrared region of the spectrum have been generated with continuous wave pumped Ti:sapphire lasers. See, for example, the publications by Spence et al., Optics Letters, Vol. 16, No. 1, Jan. 1, 1991, pages 42-44; Sarukura et al., Optics Letters, Vol. 16, No. 3, Feb. 1, 1991, pages 153-155; and, Keller et al., Optics Letters, Vol. 16, No. 13, Jul. 1, 1991, pages 1022-1024.

There are instances, however, where it is necessary to have two independently tunable streams of pulses of approximately 100 femtoseconds duration and which exhibit less than 100 femtoseconds of jitter relative to each other. Presently it is not possible to generate two independently tunable high repetition rate streams of approximately 100 femtoseconds pulses which have less than 100 femtoseconds of jitter. This invention is directed toward solving this problem.

SUMMARY OF THE INVENTION

This invention relates to the generation of at least two streams of independently tunable optical pulses which have less than 100 femtoseconds of jitter relative to each other. A first stream of pulses having durations which are not greater than 130 femtoseconds are generated by a first laser. This first stream of pulses is split into two parts, one of which is the first of the two desired streams of pulses; and the other of which is used to synchronously pump a second laser which exhibits strong gain saturation and which generates pulses having durations which are greater than the duration of the pump pulses. The stream of optical pulses generated by the second laser is the second of the two desired streams and will have less than 100 femtoseconds of jitter relative to the first stream of pulses provided that the pulses of the first stream used to pump the second laser have durations which are less than the duration of the pulses of the second laser.

DETAILED DESCRIPTION

Presently, an optical parametric oscillator which is pumped by femtosecond pulses will produce synchronized visible and near-infrared femtosecond pulses. See the publications of Edelstein et al., Appl. Phys. Lett. 54, May 1, 1989, pages 1728-1730; and, Wachmann et al., Optical Letters, Vol. 15, No. 2, Jan. 15, 1990; pages 136-138.

While two streams of femtosecond pulses where each pulse stream is of a different wavelength can be generated with either optical parametric oscillators or dye lasers, it is to be noted that they differ in several aspects. First, a dye is an incoherent energy converter which requires no critical phase matching and, because it is used at resonance, short interaction lengths are required. Thus, dispersion is minimized. Second, dyes have a finite energy storage time, in contrast to a parametric process where there is no energy storage time. Third, because the dye exhibits a large emission cross section, approximately $10^{-16}$ cm$^2$, gain saturation is an important shaping mechanism in the pulse turnoff. In optical parametric oscillators (OPO's), the gain saturation is not important and the pulse dynamics are determined by the pump pulse and dispersive limits. Finally, dyes can be operated at relatively small Stokes shifts, making small wavelength shifts possible.

In this invention there is here disclosed a 100 femtosecond CW mode locked Ti:sapphire laser to generate a first stream of femtosecond pulses. A portion of the first stream is used to pump a hexamethylindotricarbocyanine iodide (HITCI) dye laser synchronously. The dye laser produces a second tunable pulse stream that exhibits less than 100 femtoseconds of jitter with respect to the first stream of pulses when the duration of the pump pulses are shorter than the duration of the pulses generated.

Figure 1:
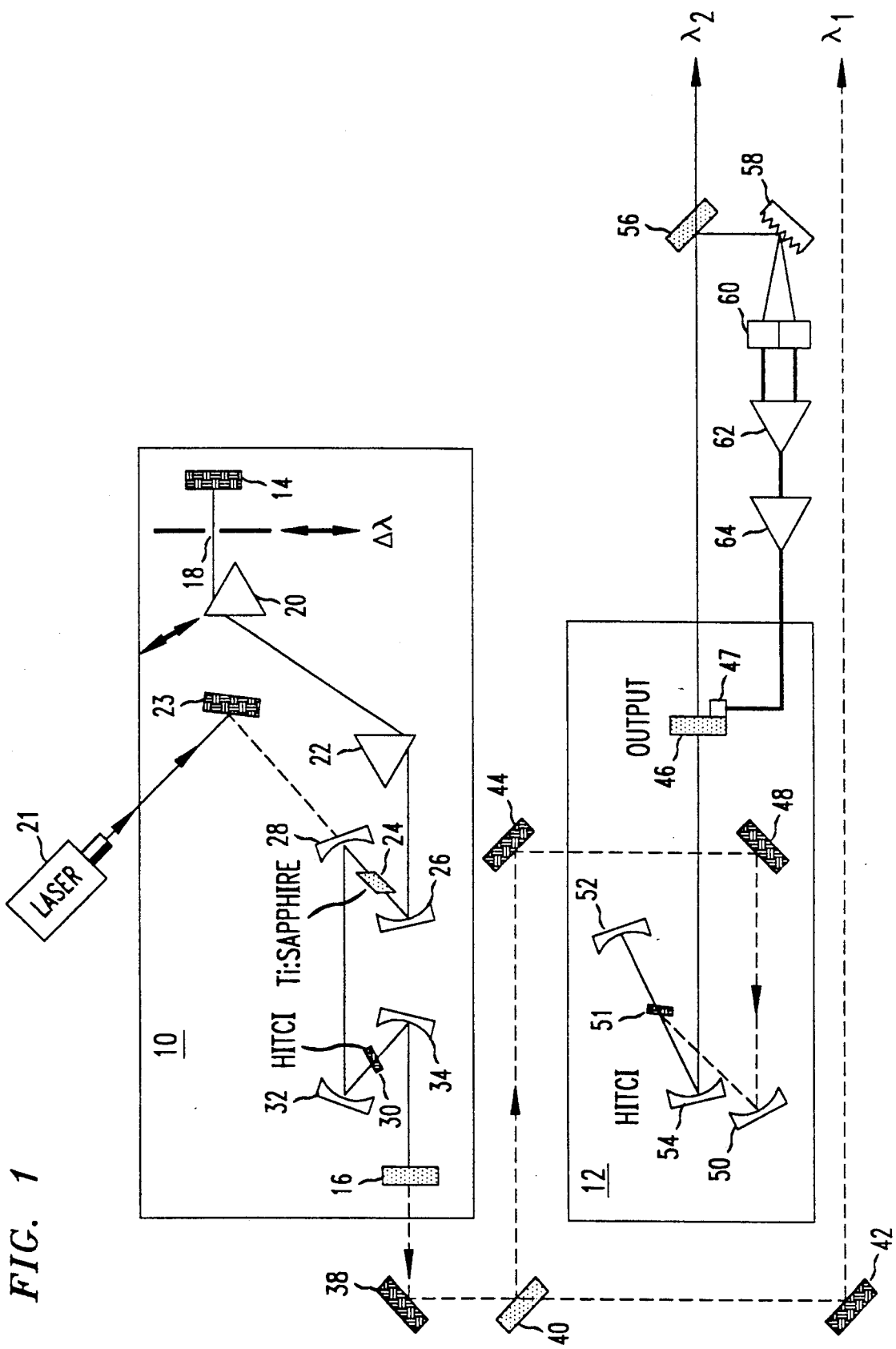
FIG. 1 is a schematic of a first laser arranged to synchronously pump a second laser in accordance with the invention.

Referring to FIG. 1, there is disclosed apparatus for generating two independently tunable streams of femtosecond pulses which have high repetition rates and which exhibit less than 100 femtoseconds of jitter relative to each other. To provide an understanding of the time durations of the optical pulse signals and jitter being discussed, the following descriptive analysis is provided. For practical purposes, it can be assumed that a pulse of light requires approximately one second to travel from the earth to the moon. Now, this being so, 100 femtoseconds is that interval of time that is required for a pulse of light to travel about one-half the thickness of a human hair. A Ti:sapphire laser 10, such as a Spectra-Physics Model 3900 laser, which is self mode locked by self focusing in the gain medium uses a weak hexamethylindotricarbocyanine iodide (HITCI) intercavity dye jet for starting. The optical pulse signal $\lambda_1$ from this laser is the first of the two independently tunable femtosecond pulses $\lambda_1$ and $\lambda_2$. The first pulse optical signal $\lambda_1$, which is tunable from 750 to 870 nm, is used to synchronously pump a second laser 12 which has a 300 μm thick dye jet with a pulse width of substantially 100 femtosecond duration, and an average power of about 150 mW. The dye jet is placed in a three mirror cavity, the length of which is controlled with a low voltage piezoelectric stack, and the pump threshold is about 60 mW. More specifically, the first laser 10 comprises a cavity defined by a high reflecting dielectric mirror 14 and a partially reflecting dielectric mirror 16 which may be variable. The cavity includes a slit 18, first and second prisms 20, 22, a rod of sapphire material doped with titanium 24 positioned between two concave mirrors 26, 28, and a dye 30 positioned between two concave mirrors 32, 34. The slit 18 is used to tune the laser to a desired wavelength. By moving the slit as indicated by the arrow, the laser can be tuned to different wavelengths. The prisms 20, 22 have a dual function; first, that of tuning the laser to a specific wavelength and, second, to control the group velocity dispersion (GVD) of the optical pulse within the cavity. Thus, the prism pair 20, 22 helps to obtain short pulses. The HITCI intercavity dye jet 30 is of low power and helps to cause the laser to be self mode locked. The concave mirrors are used to obtain high power by focusing the optical pulses. An argon laser 21 is used to pump the Ti:sapphire rod 24. The green light from the argon laser 21 is directed via a mirror 23 to excite the Ti:sapphire rod 24. It is to be noted that concave mirror 28 is transparent to the green light from the argon laser 21.

The optical pulses $\lambda_1$ generated by the laser 10 are used to pump a second laser 12. The optical pulses $\lambda_1$ which pass through partially reflecting mirror 16 are directed via a mirror 38 to a variable, partially reflecting mirror 40. The optical pulses of wavelength $\lambda_1$ which pass through the mirror 40 can be directed by a high reflecting mirror 42 along a first desired path to become the first stream of optical pulses. The optical pulses $\lambda_1$ which are reflected by the mirror 40 are used to synchronously pump an HITCI dye jet laser 12.

In FIG. 1, the second laser 12 is shown as being an HITCI dye jet laser. It is to be understood, however, that any dye which absorbs the Ti:sapphire output optical pulses or a harmonic (2w, 3w, 4w . . . etc.) of the Ti:sapphire output can be used.

The second laser 12 has a three mirror cavity, the length of which can be controlled with a low voltage piezoelectric stack 47. The optical pulses $\lambda_1$ reflected by the partially reflecting mirror 40 are directed via high reflecting mirrors 44, 48 and concave focusing mirror 50 to pump the HITCI dye jet 51. The cavity of the second laser 12 has a length defined by focusing mirror 52 and partially reflecting mirror 46 via focusing mirror 54. The total length of the cavity of laser 12 is set to be the same as that of laser 10. Thus, for laser 10, the optical path of the cavity which extends from mirror 14 to mirror 16 via prisms 20, 22 and focusing mirrors 26, 28, 32, 34 is equal to the length of the cavity of laser 12 which is the optical path from focusing mirror 52, via focusing mirror 54 to partially reflecting mirror 46. It is to be noted that the wavelength of the dye laser 12 changes linearly as the length of the cavity of the dye laser is changed.

Continuing with FIG. 1, there is illustrated apparatus for automatically adjusting the length of the cavity of dye laser 12 to provide the highest gain possible to enable the pulse signals of the laser 12 to be timed to the pump pulse signals of laser 10. More specifically, a partially reflecting mirror 56 is positioned to deflect a small portion, for example, 4% of the pulse signal $\lambda_2$ to a defraction grating 58 which spreads the spectrum of the pulse signal. A pair of photodiodes 60 are positioned to detect the spread out optical pulses from the grating. A differential amplifier 62 coupled to receive the signals from the photodiodes generates a signal which is proportional to the difference of the signals from the photodetectors. The output signal from the differential amplifier 62 is amplified in an amplifier 64, and this signal is applied to the piezoelectric element coupled to the mirror 46 to control the length of the cavity.

Figure 2:
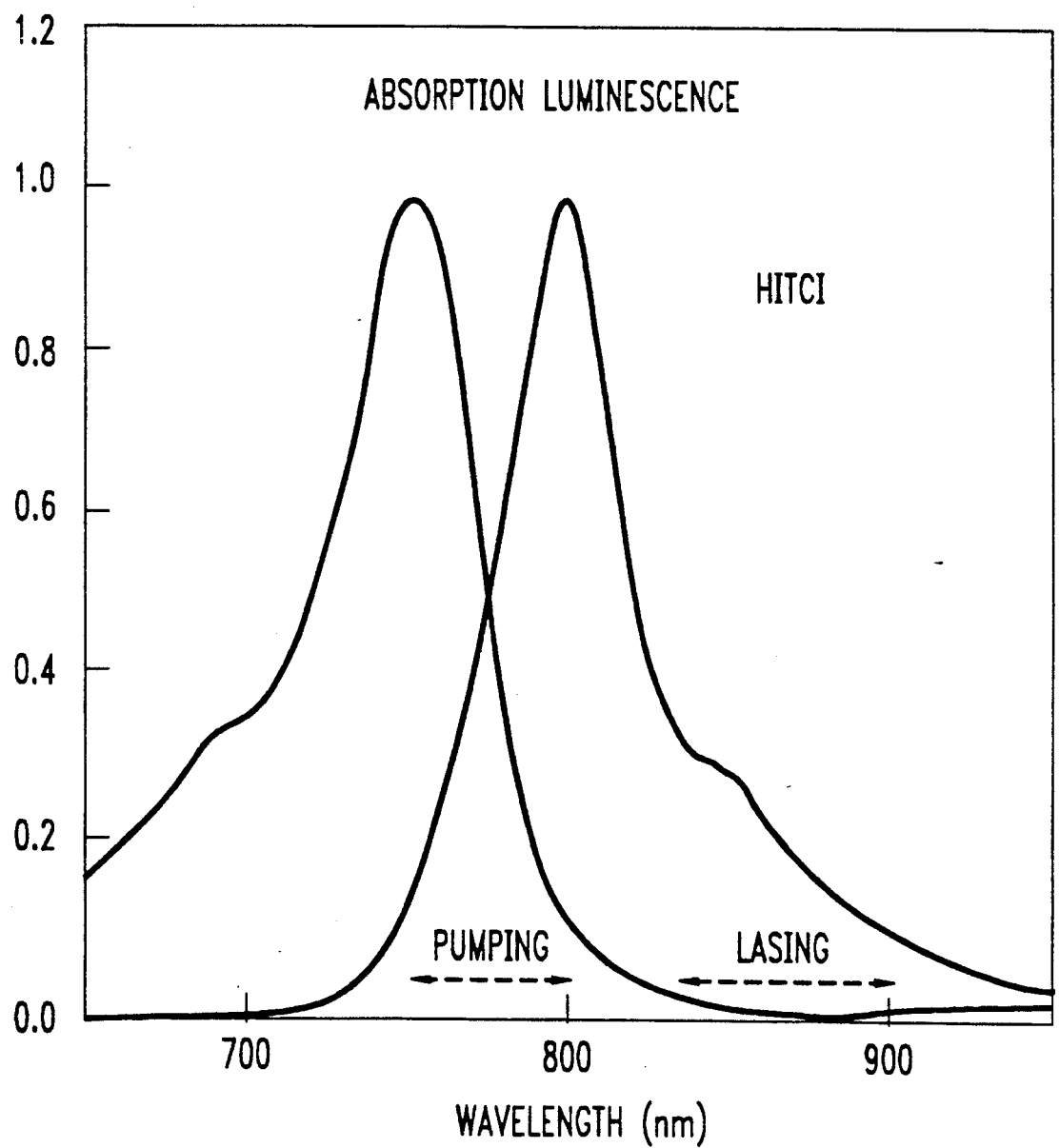
FIG. 2 is a plot of the spectroscopy of a hexamethylindotricarbocyanine iodide (HITCI) laser dye.

Referring to FIG. 2, there is illustrated the spectroscopy of the saturable absorber dye 1,1',3,3,3',3'-hexamethylindotricarbocyanine iodide (HITCI) at a concentration of $3.6 \times 10^{-5}$M in ethylene glycol. It is to be noted that the dye laser lases when the pump wavelength is in the range of 750 to 800 nm. The mirrors of Ti:sapphire laser limit the short range; and the dye absorption wing limits the long end. The HITCI laser 12 can be tuned from 840–900 nm, with the short range being limited by re-absorption and the long end being limited by the gain spectrum of the HITCI. Both the pump range and the output range depend on dye concentration and pump power.

Figure 3:
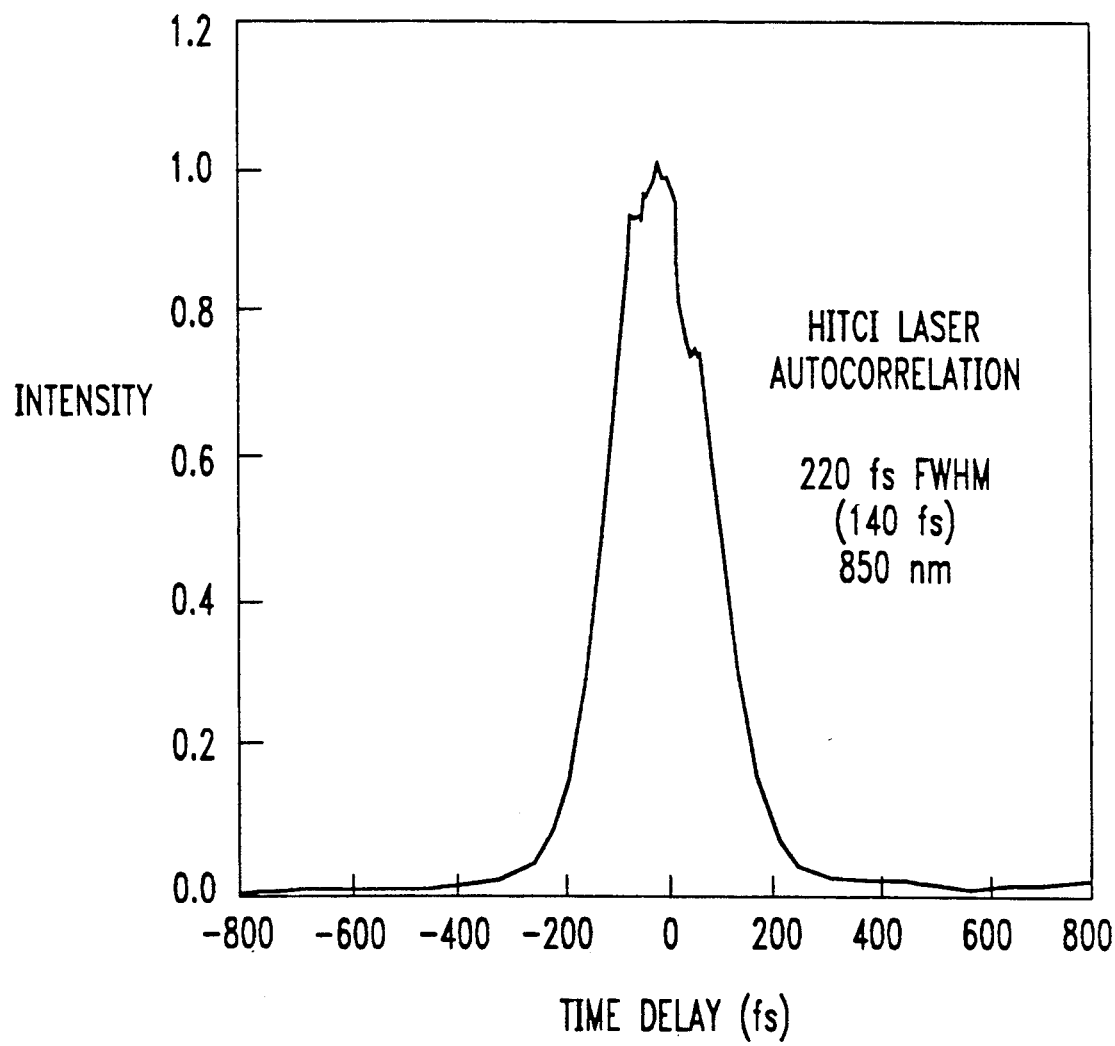
FIG. 3 illustrates the autocorrelation of the dye laser output at 850 nm wavelength.

FIG. 3 illustrates the autocorrelation of the HITCI dye laser output at 850 nm wavelength. The term autocorrelation refers to a nonlinear measurement technique used to measure the duration of the very short pulses and it is used because the pulses themselves are so very short that they cannot be measured directly. The measurement technique goes back to nonlinear optics. It is noted, however, that the procedure of actually measuring the duration of the optical pulses is not required for a full and complete understanding of the invention.

Figure 4:
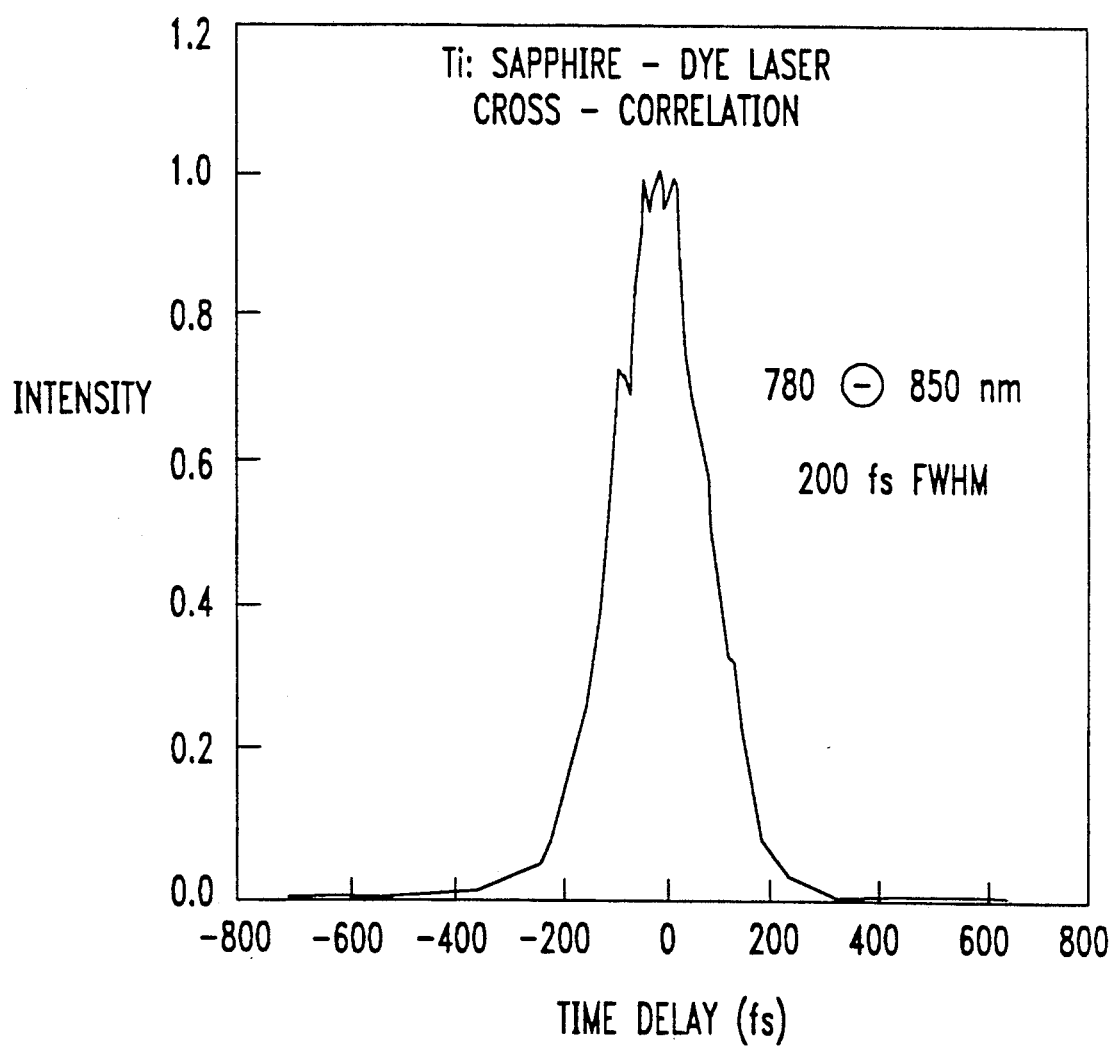
FIG. 4 illustrates the cross-correlation with 780 nm Ti:sapphire laser pump pulses obtained with a 1 mm thick LiIO$_3$ crystal.
Figure 5:
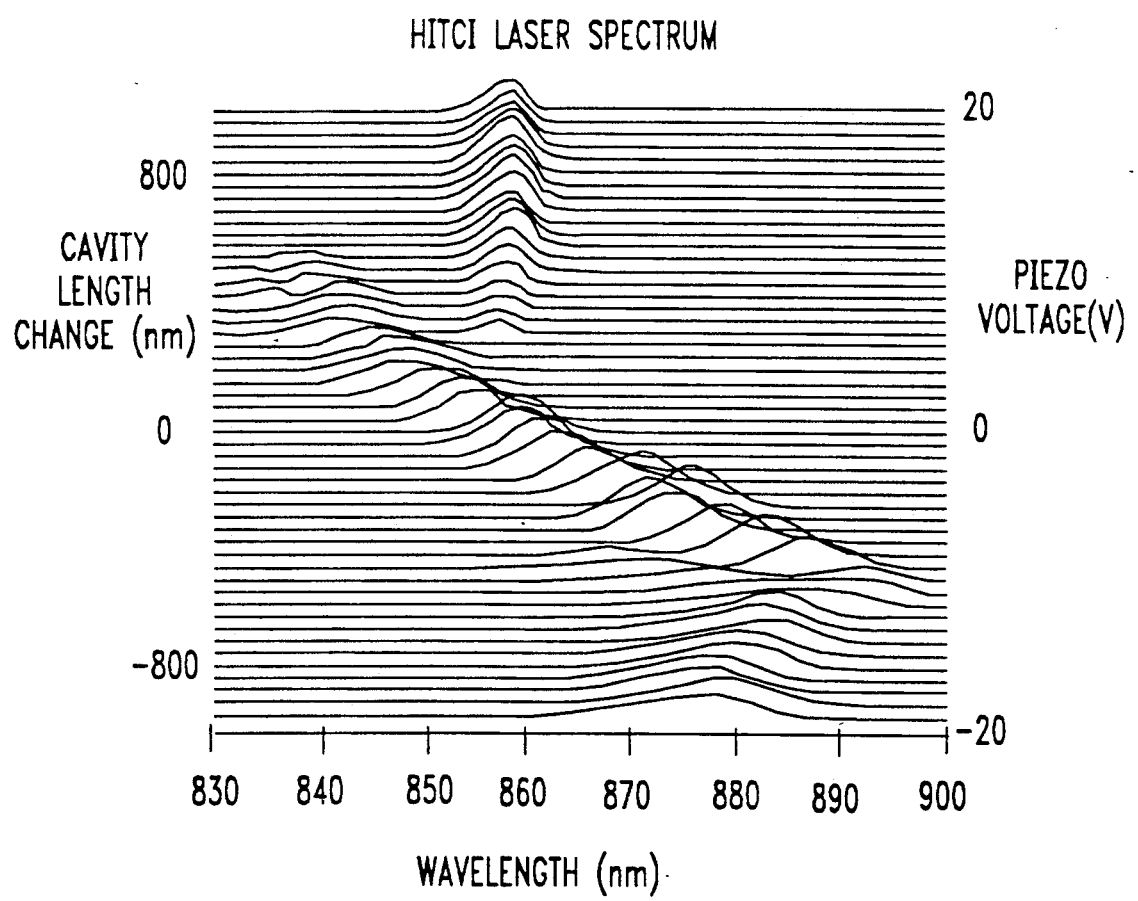
FIG. 5 illustrates the spectrum of a dye laser as a function of cavity length.

In FIG. 4, the full width half maximum (FWHM) is 220 femtoseconds which, through standard deconvolution theory, indicates a pulse width of 140 femtoseconds. FIG. 5 illustrates the cross-correlation with the 780 nm Ti:sapphire laser pump pulses obtained with a 1 mm thick $LiIO_3$ crystal. The cross-correlation measurement is 200 femtoseconds FWHM, which is slightly shorter than the dye laser full width. Now, since the Ti:sapphire pulses are substantially 100 femtoseconds in duration, it is to be expected that the cross-correlation would be slightly shorter than the dye laser autocorrelation provided that the jitter is small. From this measurement it is concluded that the jitter is less than 100 femtoseconds, although a more precise measurement of the jitter would require a complete analysis of the pulse shape.

It is to be noted that, with this invention, the width of the pump pulse is shorter than the pulse width of the generated signal and that the dye pulse apparently locks itself in synchronization with the 100 femtosecond pump pulse. The pulse is turned on by the rapidly rising gain and turned off immediately thereafter by gain saturation. The low jitter is a consequence of the short duration of the pump pulse. At higher pump powers, the cross correlation appears to become slightly asymmetric thus indicating that gain saturation dynamics influences pulse turn off.

In contrast to this invention, with an optical parametric oscillator (OPO) the pulse is turned on and off by the instantaneous parametric gain that is induced by the pump pulse. The use of short pump pulses is necessary but not sufficient to obtain less than 100 femtosecond jitter. In addition, the pump source must have low noise and high stability.

A reason that the use of a passively mode-locked Ti:sapphire pump source leads to lower jitter is that the stability of the pulses from the Ti:sapphire pump source is vastly superior to actively mode locked and compressed pump sources.

Synchronously pumped femtosecond dye lasers are known to be sensitive to cavity length fluctuations. In this invention, the gain rises rapidly, within 100 femtoseconds, and the dye laser pulse is emitted near t=0.

If the cavity length is mismatched from the pump cavity length, the pulse will begin to slide down the decaying gain curve. But, when this occurs, the dye laser will attempt to compensate to maintain optimum timing and gain.

The dye laser cavity has a small but positive dispersion, in contrast to the Ti:sapphire laser cavity, which has a fairly large negative dispersion in self mode locked operation. In response to a cavity length change over a limited range, the dye laser tries to change its wavelength to find a new group delay that matches the timing of the pump pulse. Thus, the highest steady state round trip gain is obtained.

Referring to FIG. 5, there is illustrated the spectrum of the dye laser as a function of cavity length. The spectrum is found to track linearly within a certain locking range. Outside of this range, the locking is frustrated by reabsorption on the short range and by lack of gain at the long wavelength end. In the end regions, the pulses are not properly mode locked which suggests noise autocorrelations. This is used to actively lock the cavity length. As noted previously and as illustrated in FIG. 1, two photodiodes are illuminated by a small portion of the output signal from a diffraction grating, and the difference signal is amplified with a lock-in amplifier and fed back directly to the low voltage piezoelectric stack. This arrangement is very effective and fully compensates for slow drift. When desired, the dye laser can be tuned by simply tilting the diffraction grating.

Figure 6:
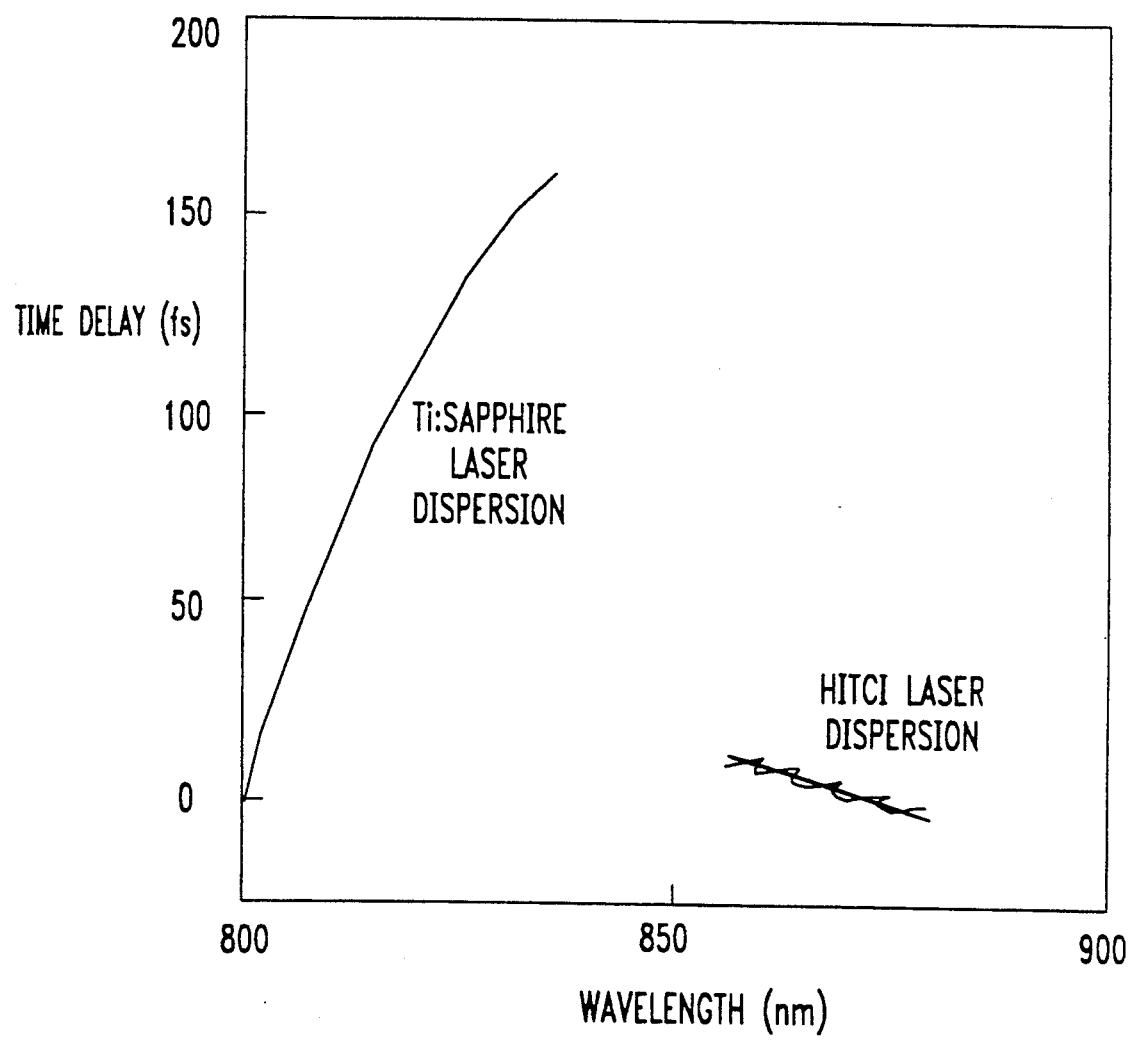
FIG. 6 illustrates the dispersion of pump and dye laser cavities as determined from frequency domain technique.

Because the repetition rate of the dye laser matches exactly the repetition rate of the Ti:sapphire laser, it is possible to measure its intracavity dispersion. FIG. 6 illustrates the group delay as a function of wavelength measured under typical operating conditions for the Ti:sapphire laser. FIG. 6 was obtained by measuring the wavelength dependence of the repetition rate. The Ti:sapphire laser was tuned in a narrow range near 785 nm. At this range, the repetition rate varies and the dye laser tunes its wavelength to exactly match the pump repetition rate. If the dye laser wavelength is plotted against the Ti:sapphire repetition rate, the dye laser dispersion is obtained because the repetition rates are the same. FIG. 6 illustrates the results. As expected, the dye cavity has a dispersion that is small but positive because the dye jet is the only element in the cavity. The publication by Wachmann in Appl. Phys. Lett. 54, dated May 1989, pages 1728-1730 discloses a femtosecond optical parametric oscillator (OPO) which exhibits identical tuning behavior. Actually, any laser that exhibits a flat tuning curve and has a finite intercavity dispersion will do so when pumped by a highly stable source.

Stated succinctly, in this invention, a stream of short pulses, such as pulses of 100 femtoseconds in duration are used as the pump signal for a dye laser having a gain medium which exhibits strong gain saturation. The stream of pulse signals generated by this laser have less than 100 femtoseconds of jitter relative to the stream of pump signals when the duration of the pulses of the generated stream are greater than the duration of the pulses of the pump stream. The term strong gain saturation as used herein for the dye jet laser means that the dye pulse energy should be at least 10% of the stored energy in the dye jet.

The availability of independently tunable femtosecond pulses at a high repetition rate makes new experiments possible. More specifically, difference frequency generation is facilitated, and the present wavelength ranges can produce difference wavelengths from 5 through 13 $\mu$m with the appropriate nonlinear crystals. In addition, dyes can be pumped with the second harmonic of the Ti:sapphire laser, two dye lasers can be pumped with either widely spaced wavelengths or nearly degenerate wavelengths, and further gain media can be placed in the dye-laser cavity. In the last noted instance, the Ti:sapphire laser is considered a master oscillator that generates 100 femtoseconds clock pulses that can be wavelength shifted as desired.

It will thus be appreciated that those skilled in the art will be able to devise numerous arrangements which, although not explicitly shown or described herein, embody the principles of the inventions. Accordingly, all such alternatives, modifications and variations which fall within the spirit and broad scope of the appended claims will be embraced by the principles of the invention.

I claim:

1. Apparatus for generating two streams of pulses comprising
   a first laser for generating a first stream of optical pulses having durations not greater than 130 femtoseconds,
   means to split the stream of optical pulses from said first laser into two streams,
   a second laser that exhibits strong gain saturation coupled to be pumped by one of said two streams of pulse signals from said first laser to generate a second stream of optical pulses having durations which are greater than the durations of optical pulses of the pump stream.

2. Apparatus for generating two streams of femtosecond pulses having less than 100 femtoseconds of jitter comprising
   a first CW pumped self mode locked solid state laser for generating a first stream of optical pulses having durations of at least 130 femtoseconds,
   a second laser that exhibits strong gain saturation,
   means for pumping said second laser with said first stream of optical pulses from said first laser to generate a second stream of optical pulses having durations which are greater than the durations of optical pulses of said first stream.

3. The apparatus of claim 2 wherein
   said first stream of optical pulses used to pump said second laser comprises at least 150 mW of pump power.

4. The apparatus of claim 3 wherein
   said second laser has a cavity which has a small but positive dispersion relative to the cavity of said first laser which has a large negative dispersion in self mode locked operation.

5. The apparatus of claim 4 wherein
   said first laser is a Ti:sapphire laser.

6. The apparatus of claim 5 wherein
   said first laser in self mode locked by self focusing in the gain medium.

7. The apparatus of claim 6 wherein
   said Ti:sapphire laser includes a weak HITCI intercavity dye jet for starting.

8. The apparatus of claim 7 wherein
   said first laser is tunable from 750 to 870 nm. and said second laser is tunable from 840 to 900 nm.

9. The apparatus of claim 4 wherein
   said first laser and said second laser are tunable.

10. The apparatus of claim 9 wherein
    said second laser is a dye laser.

11. The apparatus of claim 10 wherein
    said dye laser is an HITCI dye laser.

* * * * *